(12) United States Patent
Gill et al.

(10) Patent No.: US 6,533,082 B2
(45) Date of Patent: *Mar. 18, 2003

(54) ELECTRIC PARKING BRAKE

(75) Inventors: Jeremy J. Gill, Clarkston, MI (US); Michael Slumba, Clarkston, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/728,174

(22) Filed: Dec. 1, 2000

(65) Prior Publication Data

US 2002/0066626 A1 Jun. 6, 2002

(51) Int. Cl.⁷ .................. F16D 65/36; F16D 55/08; F16D 55/16
(52) U.S. Cl. .............. 188/156; 188/72.8; 188/2 D
(58) Field of Search .............. 188/2 D, 72.6, 188/72.8, 156, 158; 74/502.4, 501.5 R; 192/219.4

(56) References Cited

U.S. PATENT DOCUMENTS 3,729,070 A * 4/1973 Le Marchand .............. 188/170
3,890,810 A * 6/1975 Domig .................... 139/370.1
6,386,338 B1 * 5/2002 Powrozek ............... 188/106 P

OTHER PUBLICATIONS

US2001/0025735 to Midorikawa et al.*

* cited by examiner

Primary Examiner—Jack Lavinder
Assistant Examiner—Melody M. Burch
(74) Attorney, Agent, or Firm—Casimir R. Kiczek (57) ABSTRACT

An electric parking brake includes a motor and a transmission coupling a threaded lead screw to the output shaft of the motor. The transmission preferably includes a plurality of helical gears such that the lead screw and the output shaft are coaxial. A guide shaft extends substantially parallel to and spaced apart from the lead screw. A drive nut threadably receives the lead screw and slidingly receives the elongate guide shaft. A brake cable is connected to the drive nut at a position preferably located midway between the lead screw and the guide shaft. In operation, rotation of the lead screw causes linear motion of the drive nut along the lead screw and the guide shaft which causes tensioning and untensioning of the brake cable. The assembly preferably includes a manual override device operatively connected to the lead screw for manual rotation of the lead screw.

23 Claims, 8 Drawing Sheets

Fig. 11

ELECTRIC PARKING BRAKE

FIELD OF THE INVENTION

The present invention generally relates to parking brakes and, more particularly, to electrically powered parking brakes.

BACKGROUND OF THE INVENTION

Almost all vehicles have a parking brake mechanism, and most of these vehicles have a hand or foot activated lever for manually actuating the parking brake mechanism. Typically, these levers are attached to a cable that causes displacement of the cable and operation of the attached parking brake mechanism. There is a need to provide an electrically actuated cable mechanism that operates reliably with a minimum number of parts and has a low cost, so that manually actuated mechanism may be replaced or easily selectively replaced.

It is known in the art to provide electric-motor driven brake systems. For example, see U.S. Pat. Nos. 4,281,736, 4,561,527, 4,629,043, 4,795,002, 4,865,165, 5,180,038, 5,485,764, 5,542,513, and 5,590,744 which each disclose an electric motor-driven brake system, the disclosures of which are expressly incorporated herein in their entirety by reference.

While these electric-motor driven brake systems may adequately actuate the brake mechanisms with varying degrees of success, they are inefficient, typically can be used in conjunction with only one type of cable system, must be mounted within the vehicle, have relatively large package sizes and utilize a large number of components, they are relatively heavy, and cannot be operated when the system is not powered. Accordingly, there is a need in the art for an improved electric parking brake assembly which has improved efficiency, can be used with conventional cable systems or conduit reaction cable systems, can be mounted outside the vehicle, has a relative small package size, has a relatively small number of components, is relatively light weight, and can be manually actuated.

SUMMARY OF THE INVENTION

The present invention provides an electric parking brake for a motor vehicle which overcomes at least some of the above-noted problems of the related art. According to the present invention, an electric brake assembly for tensioning a brake cable attached to a brake such that tensioning of the brake cable affects application of the brake and untensioning of the brake cable affects release of the brake comprises, in combination, an electric motor having an output shaft, a control module coupled to the electric motor for controlling the electric motor, and a transmission coupling a threaded lead screw to the output shaft of the electric motor. The assembly further comprises a drive nut having a lead screw bore threadably receiving the lead screw therein and having a cable attachment for attaching the brake cable to the drive nut. The cable attachment has a central axis offset from a central axis of the lead screw. The control module controls the electric motor such that rotation of the output shaft causes motion of the transmission and rotation of the lead screw, rotation of the lead screw causes linear motion of the drive nut, and linear motion of the drive nut causes tensioning and untensioning of the brake cable.

According to another aspect of the present invention, an electric brake assembly for tensioning a brake cable attached to a brake such that tensioning of the brake cable affects application of the brake and untensioning of the brake cable affects release of the brake comprises, in combination, an electric motor having an output shaft, a control module coupled to the electric motor for controlling the electric motor, and a transmission coupling a threaded lead screw to the output shaft of the electric motor. The assembly further comprises an elongate guide shaft substantially parallel to and spaced apart from the lead screw, and a drive nut. The drive nut has a lead screw bore threadably receiving the lead screw therein and a guide shaft bore slidingly receiving the elongate guide shaft therein. The drive nut also has a cable attachment for attaching the brake cable to the drive nut. The control module controls the electric motor such that rotation of the output shaft causes motion of the transmission and rotation of the lead screw, rotation of the lead screw causes linear motion of the drive nut along the lead screw and the guide shaft, and linear motion of the drive nut causes tensioning and untensioning of the brake cable.

According to yet another aspect of the present invention, an electric brake assembly for tensioning a brake cable attached to a brake such that tensioning of the brake cable affects application of the brake and untensioning of the brake cable affects release of the brake comprises, in combination, an electric motor having an output shaft, a control module coupled to the electric motor for controlling the electric motor, and a transmission coupling a threaded lead screw to the output shaft of the electric motor. The transmission comprises a gear train having a plurality of helical gears and the lead screw and the output shaft are substantially coaxial. The assembly further comprises a drive nut having a lead screw bore threadably receiving the lead screw therein and having a cable attachment for attaching the brake cable to the drive nut. The control module controls the electric motor such that rotation of the output shaft causes motion of the transmission and rotation of the lead screw, rotation of the lead screw causes linear motion of the drive nut, and linear motion of the drive nut causes tensioning and untensioning of the brake cable.

According to even yet another aspect of the present invention, an electric brake assembly for tensioning a brake cable attached to a brake such that tensioning of the brake cable affects application of the brake and untensioning of the brake cable affects release of the brake comprises, in combination, an electric motor having an output shaft, a control module coupled to the electric motor for controlling the electric motor, a transmission coupling a threaded lead screw to the output shaft of the electric motor, and a manual override device operatively connected to the lead screw. The assembly further comprises a drive nut having a lead screw bore threadably receiving the lead screw therein and having a cable attachment for attaching the brake cable to the drive nut. The control module selectively controls the electric motor such that rotation of the output shaft causes motion of the transmission and rotation of the lead screw, rotation of the lead screw causes linear motion of the drive nut, and linear motion of the drive nut causes tensioning and untensioning of the brake cable. The manual override device selectively causes rotation of the lead screw, rotation of the lead screw causes linear motion of the drive nut, and linear motion of the drive nut causes tensioning and untensioning of the brake cable.

According to even yet another aspect of the present invention, a method for applying a brake of a motor vehicle comprises the steps of, in combination, receiving a signal to apply the brake, starting an electric motor in response to the signal to cause a cable tensioning device to tension a brake cable, monitoring cable tension and monitoring cable travel. The method further comprises the steps of stopping the electric motor upon reaching a predetermined cable tension, and stopping the electric motor upon reaching a predetermined cable travel without reaching the predetermined cable tension.

From the foregoing disclosure and the following more detailed description of various preferred embodiments it will be apparent to those skilled in the art that the present invention provides a significant advance in the technology of electric parking brakes. Particularly significant in this regard is the potential the invention affords for providing a high quality, reliable, light weight, small packaged, easily assembled and disassembled, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 2:
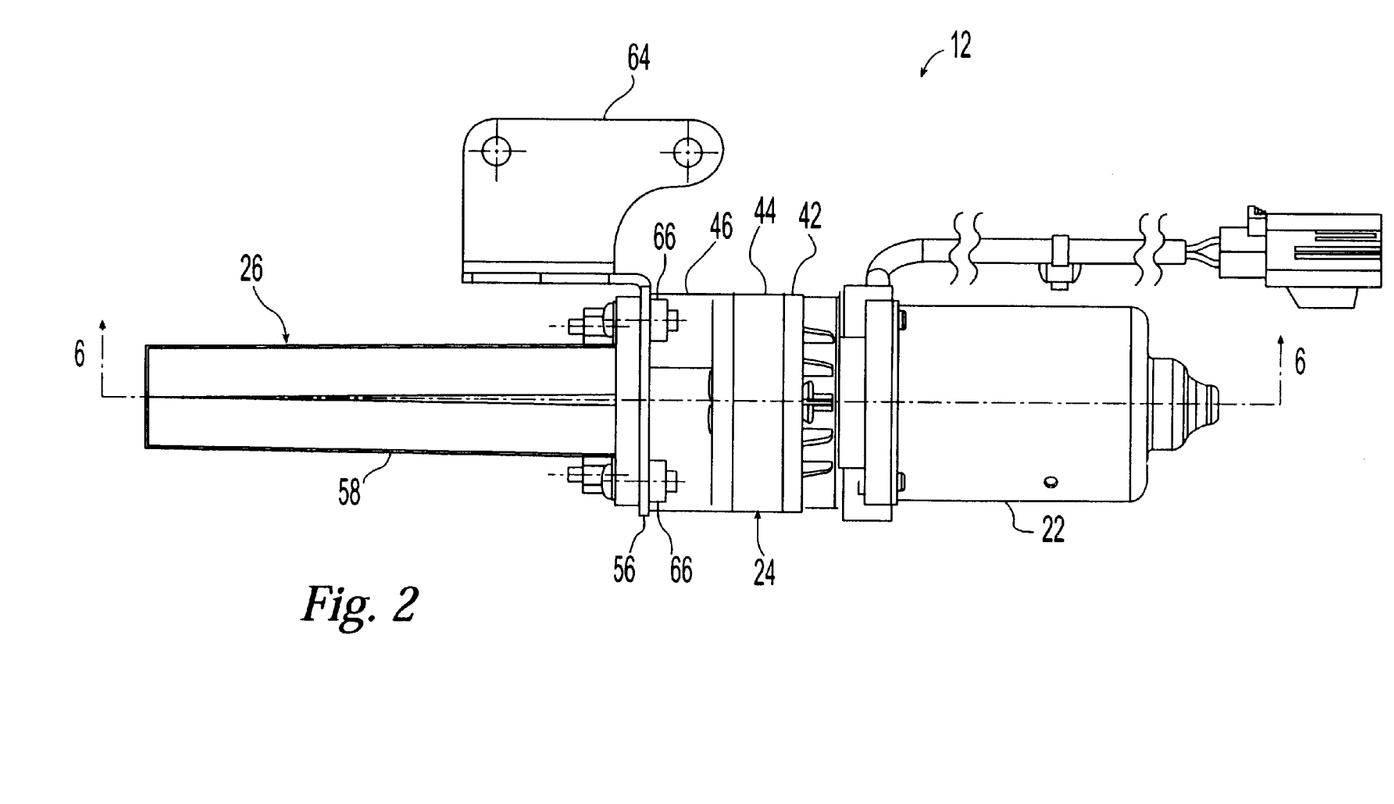
FIG. 2 is a top plan view of a cable tensioning device of the electric parking brake system of FIG. 1, wherein some components are removed for clarity.
Figures 3, 4, 5:
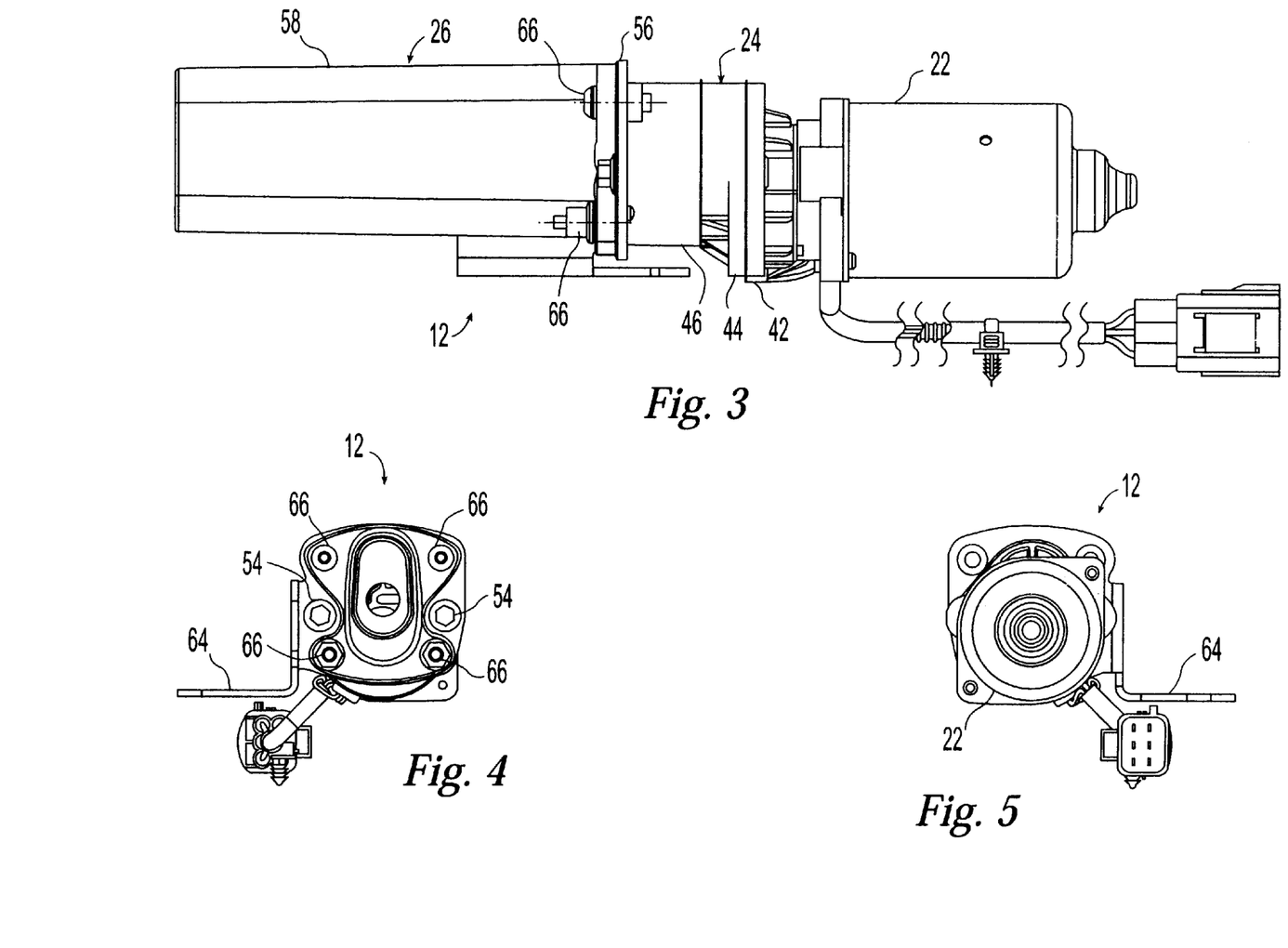
FIG. 3 is a side elevational view of the cable tensioning device of FIG. 2.
FIG. 4 is an elevational view of the rearward end of the cable tensioning device of FIGS. 2 and 3.
FIG. 5 is an elevational view of the forward end of the cable tensioning device of FIGS. 2 to 4.
Figure 6:
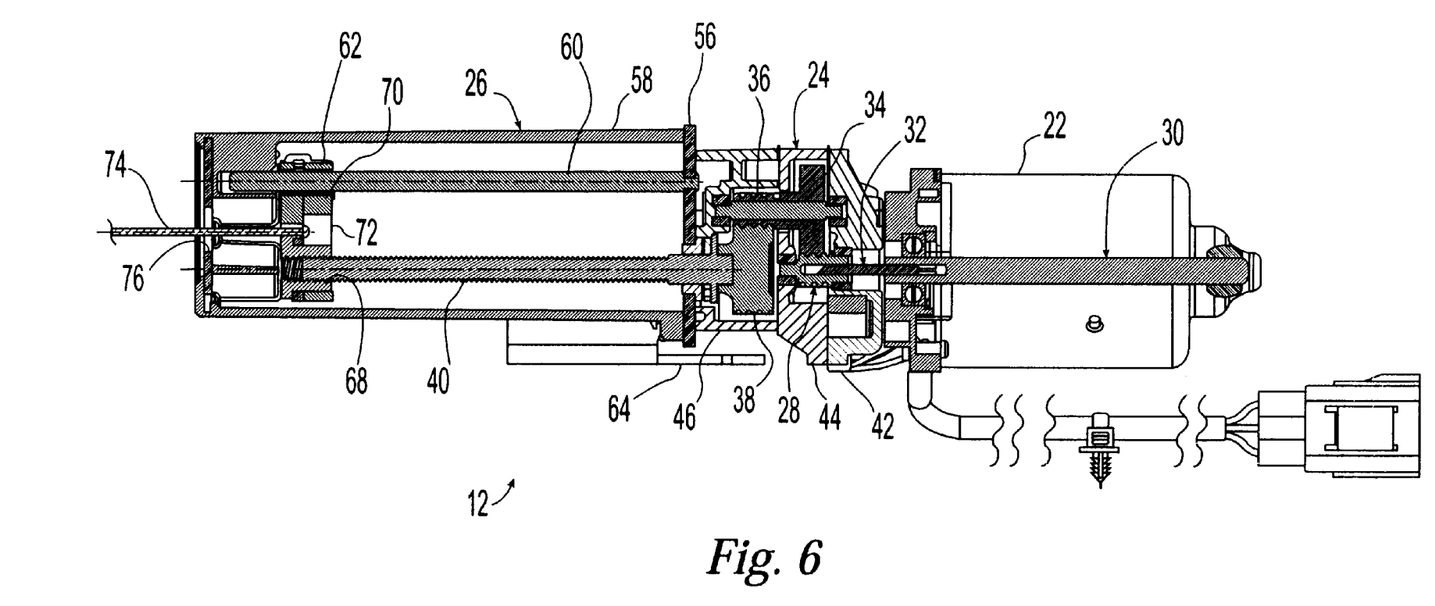
FIG. 6 is a cross-sectional view of the cable tensioning device of FIGS. 2 to 5 taken along line 6—6 of FIG. 2.

It should be understood that the appended drawings are not necessarily to scale, presenting a somewhat simplified representation of various preferred features illustrative of the basic principles of the invention. The specific design features of the electric parking brake system as disclosed herein, including, for example, specific dimensions, orientations, and shapes of the transmission and drive nut will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the electric parking brake systems illustrated in the drawings. In general, up or upward refers to an upward direction in the plane of the paper in FIGS. 2 and down or downward refers to a downward direction in the plane of the paper in FIG. 2. Also in general, fore or forward refers to a direction toward the front of the motor vehicle, that is, in a direction in the plane of the paper toward the right of the figure in FIG. 2 and aft or rearward refers to a direction toward the rear of the motor vehicle, that is, in a direction in the plane of the paper toward the left of the figure in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved electrically actuated, motor driven cable tensioning device disclosed herein. The following detailed discussion of various alternative and preferred embodiments will illustrate the general principles of the invention with reference to an electric parking brake (EPB) system for use with a motor vehicle. Other embodiments suitable for other applications will be apparent to those skilled in the art given the benefit of this disclosure.

The term "snap-fit" connection is used herein and in the claims to mean a connection between at least two components wherein at least one of the components has a protrusion or abutment which engages the other component to form an interlock or interference which retains the components together when they are connected and at least one of the components has a resiliently deformable or deflectable portion such that the deflectable portion deflects to remove the interference as the parts are brought together and resiliently snaps back to reform the interference when the components are together. The term "integral" is used herein and in the claims to mean two or more members connected together to form a single body. The term "unitary" is used herein and in the claims to mean a member made of a single continuous material.

The EPB system disclosed herein is designed for use with a motor vehicle, such as an automobile, according to a preferred embodiment of the present invention. While the illustrated embodiments of the present invention are particularly adapted for use with an automobile, it is noted that the present invention can be utilized with any motor vehicle having a parking brake including trucks, buses, vans, recreational vehicles, earth moving equipment and the like, and off road vehicles such as dune buggies and the like.

Figure 1:
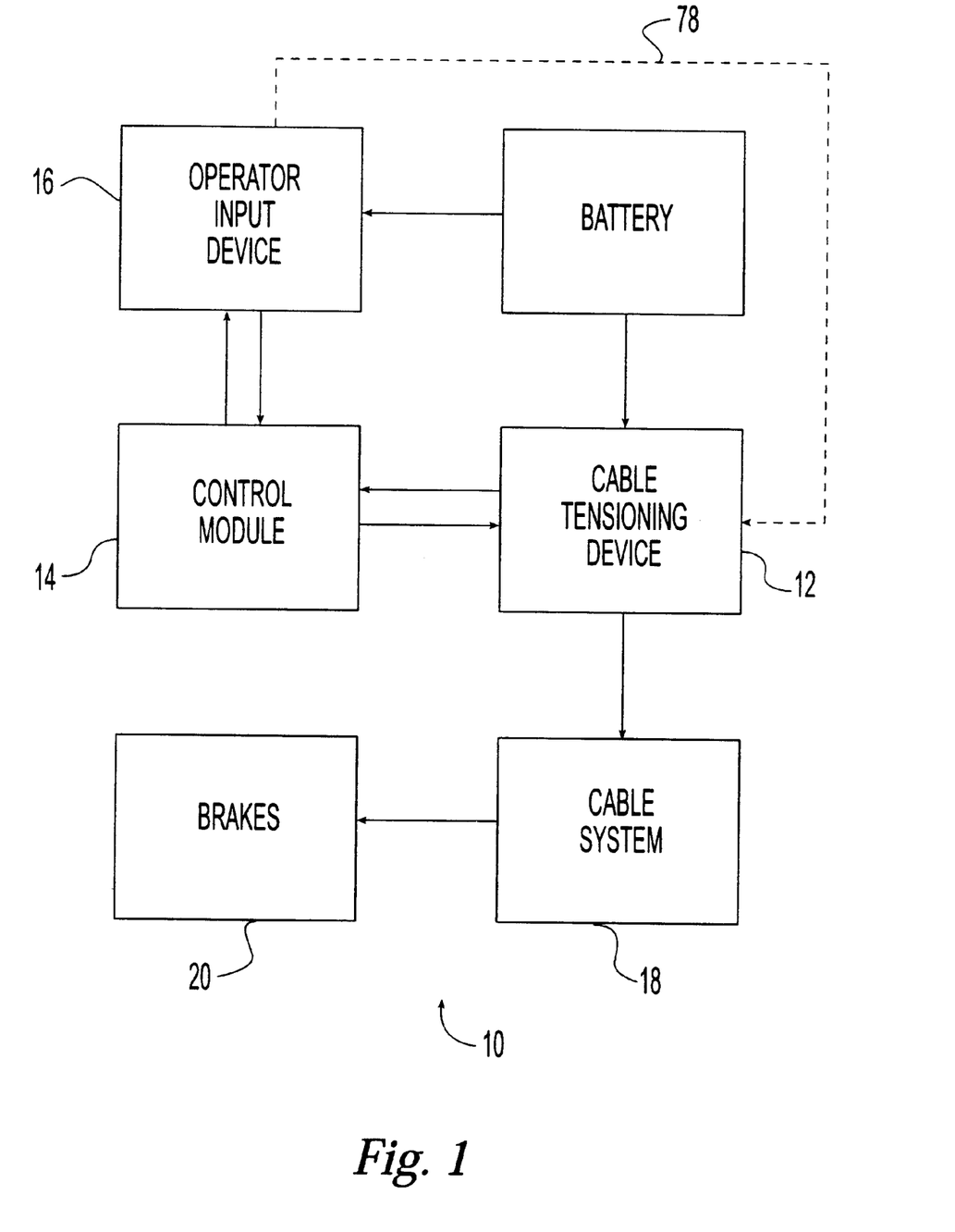
FIG. 1 is a block diagram of an electric parking brake system according to the present invention.

As best shown in FIG. 1, the EPB system 10 according to the present invention preferably comprises a cable tensioning device 12 for producing a linear motion; an electronic controller or control moduled 4 for controlling the cable tensioning device 12; an operator input device 16 for sending operator inputs to the control module 14, and a cable system 18 for transmitting the linear motion of the cable tensioning device 12 to park brake arms/pads of a conventional braking system 20.

As shown in FIGS. 2–5, the illustrated cable tensioning device 12 includes an electric motor 22, a transmission assembly 24, and a drive nut assembly 26. The electric motor 22 is preferably a permanent magnet direct current (DC) motor, which can selectively rotate in either direction depending on the provided control signal. The electric motor 22 is preferably provided with a sensor for sensing rotations and providing electrical signals representative of the rotations. A suitable sensor is believed to be a Hall effect device or sensor. While the sensor, is preferably integral with the electric motor 22, it is noted that the sensor can be separate from the electric motor 22 and can be located at any suitable location along the power train.

The illustrated transmission assembly 24 includes a gear train of helical or spur gears and transmission housing members generally enclosing the gear train. While the illustrated transmission assembly utilizes helical gears to adjust shaft speed and torque in a desired manner, it is noted that other means for reducing speed and increasing torque can be utilized such as a belt system and other types of gear members can be utilized such as worm gears. The illustrated gear train include a first pinion gear 28 driven by an output or drive shaft 30 of the electric motor 22 through a connecting shaft 32, an idler gear 34 engaging and driven by the first pinion gear 28, a second pinion gear 36 rotatable with the idler gear 34, a lead screw gear 38 engaging and driven by the second pinion gear 36, and a lead screw 40 rotatable with the lead screw gear 38.

The transmission housing assembly includes an end plate 42, a housing 44, and an end cap 46. The illustrated end plate 42 cooperates with the housing 44 to form a first interior chamber for housing the first stage of the gear train, that is, the first pinion gear 28 and the idler gear 34. The end plate 42 has an opening 48 (FIG. 8) therein for connection of the connecting shaft 32 to the first pinion gear 28. The illustrated end cap 46 cooperates with the housing 44 to form a second interior chamber for housing the second stage of the gear train, that is, the second pinion gear 36 and the lead screw gear 38. The housing 44 has an opening 50 (FIG. 8) therein for connection of the idler gear 34 and the second pinion gear 36. The end cap 46 has an opening 52 (FIG. 8) therein for connection of the lead screw gear 38 and the lead screw 40 which extends outside the housing assembly. Suitable means are preferably provided for sealing the opening 52. The components 42, 44, 46 of the illustrated housing assembly are clamped together between the electric motor 22 and the drive nut assembly 26 by a plurality of mechanical fasteners 54. It is noted that the housing assembly can alternatively be secured in any other suitable manner.

The first pinion gear 28 is mounted for rotation, relative to the housing assembly, in a pair of hubs or bushings formed in the end plate 42 and the housing 44. The first pinion gear 28 is preferably substantially coaxial with the drive shaft 30 of the electric motor 22 and connected thereto by the connecting shaft 32. The connecting shaft 32 is preferably a suitable flex shaft to account for any misalignment therebetween. Connected in this manner, the first pinion gear 28 rotates along with the drive shaft 30 of the electric motor 22. The idler gear 34 is mounted for rotation, relative to the housing assembly, in a pair of hubs or bushings formed in the end plate 42 and the housing 44. The rotational axis of the idler gear 34 is preferably substantially parallel and spaced apart from the rotational axis of the first pinion gear 28. The idler gear 34 is positioned such that it engages and interconnects with the first pinion gear 28 so that the idler gear 34 rotates upon rotation of the first pinion gear 28.

The second pinion gear 36 is mounted for rotation, relative to the housing assembly, in a pair of hubs or bushings formed in the housing 44 and the end cap 46. The second pinion gear 36 is preferably substantially coaxial with the idler gear 34 and rigidly connected thereto so that rotation of the idler gear 34 rotates the second pinion gear 36. The idler gear 34 and the second pinion gear 36 can be formed of either integral or unitary members. The lead screw gear 38 is mounted for rotation, relative to the housing assembly, in a pair of hubs or bushings formed in the housing 44 and the end cap 46. The rotational axis of the lead screw gear 38 is preferably substantially parallel and spaced apart from the rotational axis of the second pinion gear 36. The lead screw gear 38 is positioned such that it engages and interconnects with the second pinion gear 36 so that the lead screw gear 38 rotates upon rotation of the second pinion gear 36. Preferably, the lead screw gear 38 is substantially coaxial with the first pinion gear 28, the connecting shaft 32, and the motor drive shaft 30.

The gear elements 28, 34, 36, 38, 40 are sized as required depending on the particular electric motor 22 utilized and the torque and speed requirements of the system 10. The transmission gear train of the illustrated embodiment produces a 9/1 ratio by having two 3:1 stages in series: the first pinion gear 28 to the idler gear 34, and (2) the second pinion gear 36 to the lead screw gear 38. It is noted that the gear train can alternatively have a fewer or greater number of stages, can have stages with different ratios, and can have a different overall ratio.

The illustrated drive nut assembly 26 includes a mounting bracket 56, a cover 58, a guide shaft 60, and a drive nut 62. The mounting bracket 56 and the cover 58 cooperate to form an elongate interior space as described in more detail hereinafter. The illustrated mounting bracket 56 is provided with a mounting flange 64 for securing the cable tensioning device 12 to the motor vehicle. The illustrated mounting bracket 56 cooperates with the mechanical fasteners 54 to clamp the transmission housing members 42, 44, 46 together. The cover 58 is secured to the mounting bracket 56 in any suitable manner such as the illustrated mechanical fasteners 66. It is noted that the mounting bracket 56 and the cover 58 can be alternatively secured in any other suitable manner.

The lead screw 40 is an elongate threaded member sized and shaped to threadably engage the drive nut 62 as described in more detail hereinafter. The lead screw 40 is mounted for rotation, relative to the transmission housing, the mounting bracket 56, and the cover 58, in a hub or bushing located in the mounting bracket 56. Any suitable bushing can be provided. The lead screw 40 is preferably substantially coaxial with the lead screw gear 38, the first pinion gear 28, the connecting shaft 32, and the motor drive shaft 30 and is rigidly connected thereto so that rotation of the lead screw gear 38 rotates the lead screw 40. The lead screw gear 38 and the lead screw 40 can be formed of either integral or unitary members. The mounting bracket 56 has an opening 67 therein for support of the bushing and passage of the lead screw therethrough. Suitable means for sealing the opening 67 are preferably provided. The lead screw 40 preferably extends at least a substantial portion of the interior space formed by the mounting bracket 56 and the cover 58.

The guide shaft 60 is generally elongate and extends substantially parallel and spaced apart from the lead screw 40. In the illustrated embodiment, the guide shaft 60 is located above the lead screw 40. The guide shaft 60 preferably extends at least the full length of the lead screw 40. The guide shaft 60 is sized and shaped to cooperate with the drive nut 62 as described in more detail hereinafter. The illustrated guide shaft 60 has a substantially circular outer surface in cross-section. The guide shaft 60 is supported at its ends by the mounting bracket 56 and the cover 58.

The drive nut 62 is provided with a pair of substantially parallel and spaced apart bores or openings 68, 70. The first bore 68 is adapted to receive the lead screw 40 therein and threaded to cooperate with the lead screw 40 so that rotation of the lead screw 40 causes the drive nut 62, when held against rotation therewith, to axially move along the length of the lead screw 40 as the lead screw 40 rotates. The second bore 70 is adapted to receive the guide shaft 60 therein and is generally smooth to cooperate with the guide shaft 60 so that the drive nut 62 is held against rotation with the lead screw 40 and slides along the guide shaft 60 as the drive nut 62 travels along the lead screw 40. The drive nut 62 is also provided with an attachment 72 for connecting a flexible cable 74 (FIGS. 9 and 10) of the cable system 18. The illustrated attachment 72 includes a notch for receiving a connector of the core or strand of the flexible cable 74. It is noted that the attachment 72 is preferably provided as near the first bore 68 as possible so that the flexible cable 74 is as close as possible to the axis of the lead screw 40 to limit the amount of off-axis loading and resulting efficiency losses. The illustrated attachment 72 is centrally located between the spaced apart bores 68, 70 so that the axis of the attachment 72, and thus the line of force of the cable 74, is located centrally therebetween. The cover 58 is provided with an opening 76 for connection of the cable 74 to the drive nut 62. The opening 76 is preferably sealed in a suitable manner.

It is noted that the axis of the attachment 72, and the cable 74 attached thereto, is offset from the rotation axis of the lead screw 40. This arrangement dramatically reduces the packaging size because it eliminates the interference which is present when a coaxial attachment is used with a generally short drive nut. To eliminate the interference, a relatively long drive nut has typically been utilized which increases the packaging size. The offset of the present invention permits the use of a relatively short drive nut 62 and thus a much smaller packaging size. The drive nut 62 is preferably has a length less than about ¼ the length of the lead screw 40, more preferably less than about ⅕ the length of the lead screw 40, and even more preferably less than about ⅙ the length of the lead screw 40. In the illustrated embodiment, the drive nut 62 has a length which is about ⅐ the length of the lead screw 40.

It is noted that the electric motor 22 is preferably reversing, that is, it operates to rotate in both directions. However, the lead screw is non-reversing to retain generated cable load, that is, the force of the tensed cable 74 is borne mechanically by the pitch of the lead screw 40 and the cooperating drive nut 62. By utilizing a purely mechanical element, this cable tension is held indefinitely, or until an input is supplied to release the EPB system 10. During the period of time when cable tension is being held and the EPB system 10 is not in an apply or release cycle current draw by the motor 22 on the vehicle electrical system is 0 amps.

While the cable tensioning device 12 of the illustrated embodiment can be located at any expedient location upon the motor vehicle, the device 12 is ordinarily located within in interior region of the motor vehicle (e.g., trunk, spare tire compartment, behind truck seat, or other location). By locating the device 12 in an interior location, corrosive and vibrational effects of the environment are reduced. It is noted, however, that the device 12 of the present invention is provided in sealed housings and thus can be located in any desired location. To minimize cost of cables, the electric motor 22 can be located as close to the rear or braked wheels as possible.

Figure 7:
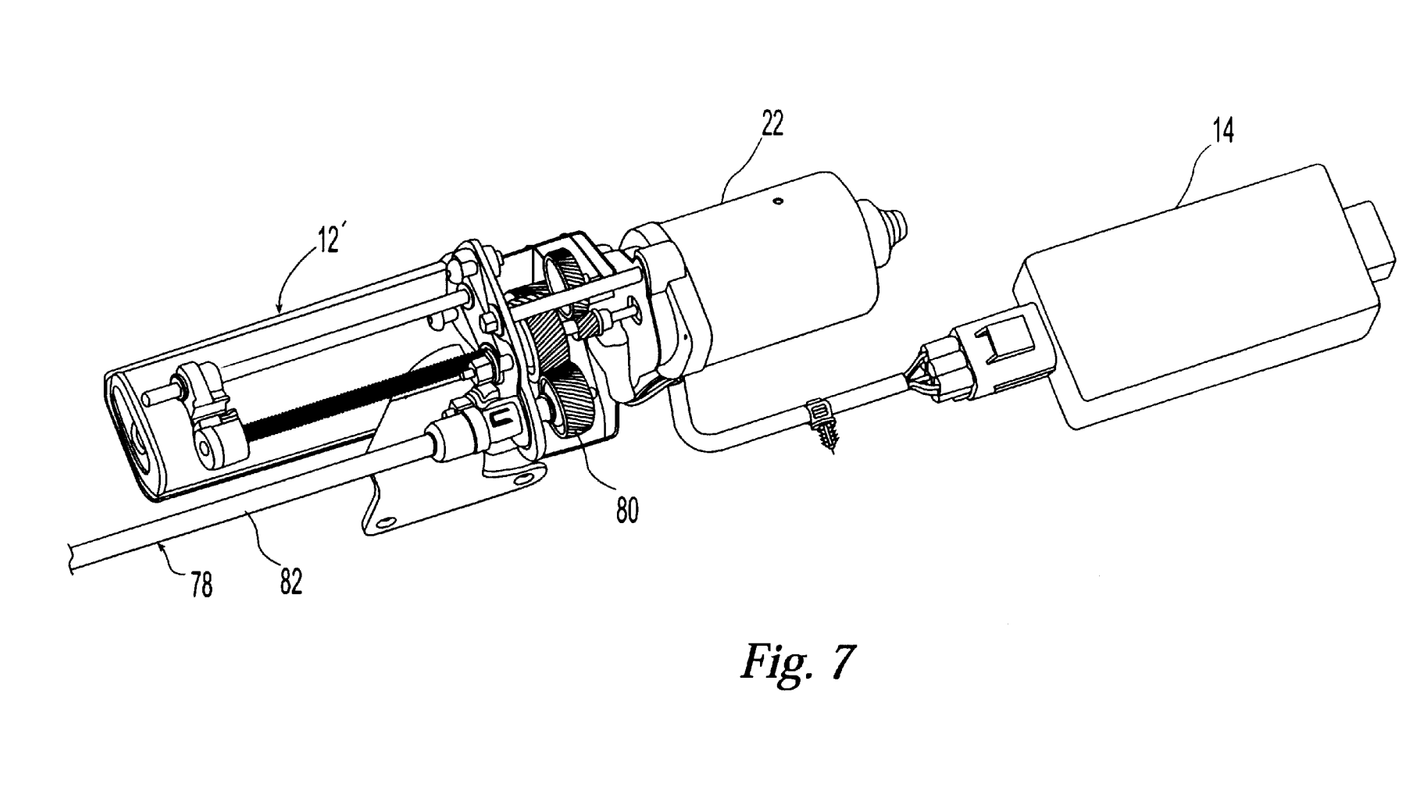
FIG. 7 is perspective view of a variation of the cable tensioning device of FIGS. 2 to 6, wherein a manual override is provided.
Figure 8:
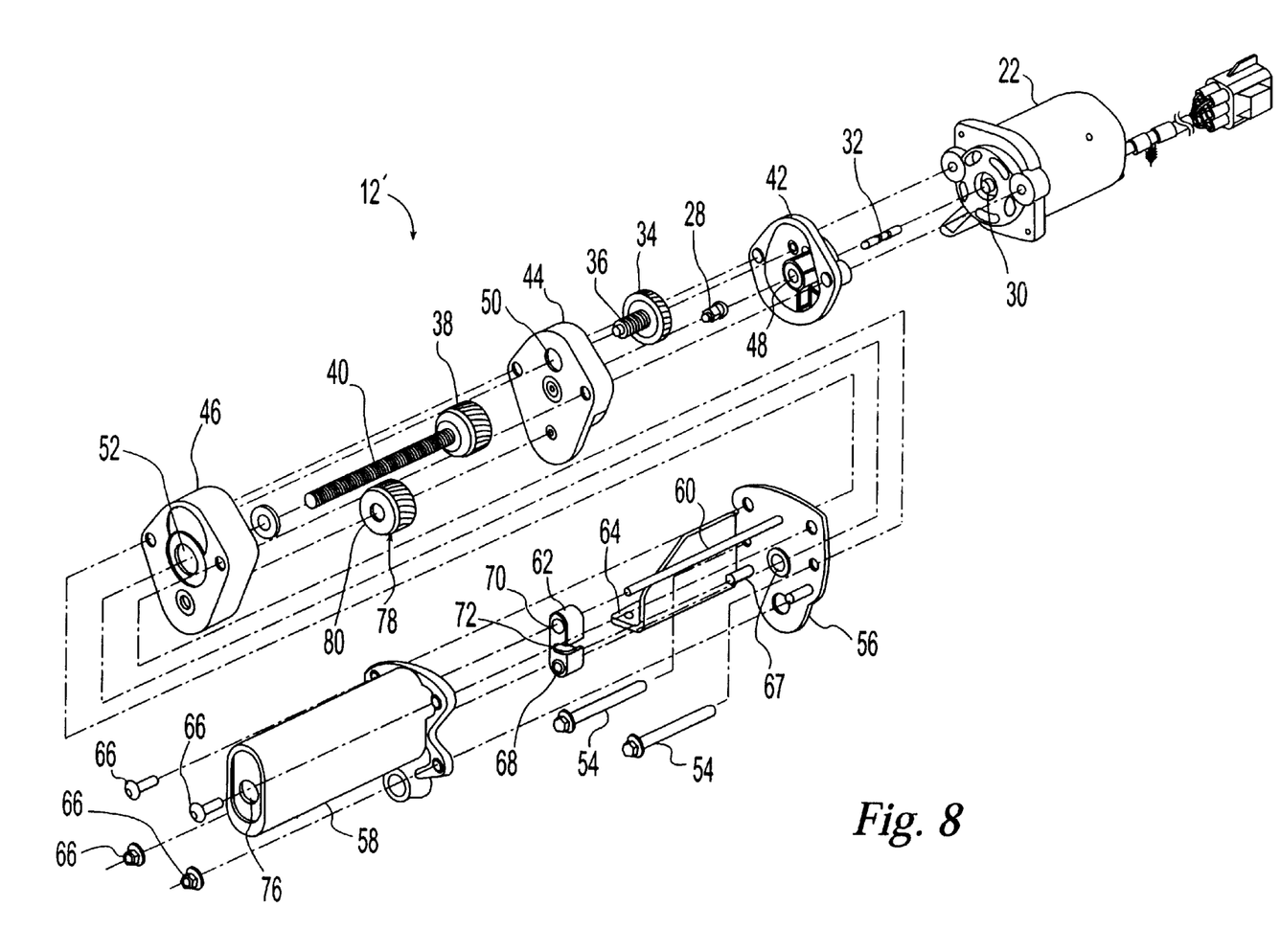
FIG. 8 is an exploded perspective view of the cable tensioning device of FIG. 7, with some components removed for clarity.

As indicated in FIG. 1, the EPB system 10 can be provided with a "manual override" 78 so that the operate can selectively manually apply and release the parking brakes 20 without utilization of the electric motor 22. FIGS. 7 and 8 illustrate a cable tensioning device 12' which is a variation of the cable tensioning device 12 of FIGS. 2–6. The device 12' of FIGS. 7 and 8 is substantially the same as the device 12 of FIGS. 2–6 except that it has been adapted to include the manual override 78. The same reference numbers have been used to indicate the same structure. The manual override 78 of the illustrated device includes an override gear 80. The override gear 80 is mounted for rotation, relative to the housing assembly, in a pair of hubs or bushings formed in the housing 44 and the end cap 46. The rotational axis of the override gear 80 is preferably substantially parallel and spaced apart from the rotational axis of the lead screw gear 38. The override gear 80 is positioned such that it engages and interconnects with the lead screw gear 38 so that the lead screw gear 38 rotates upon rotation of the override gear 80. Preferably, the override gear 80 is located on an opposite side of the lead screw gear 38 from the second pinion gear 36. In the illustrated embodiment, the second pinion gear 36 is located above the lead screw gear 38 and the override gear 80 is located below the lead screw gear 36. The manual override 78 also includes a motion-transmitting flexible cable 82, such as a push-pull cable, having a first end connected to the override gear 80 which transmits rotational motion to the override gear 80 from the operator. The second end of the cable 82 is suitably connected to a manually operated device which will impart rotation to the core of the cable from the operator such as for example a suitable rotating handle. In operation, if the operator desires to apply or release the parking brakes, the operator rotates the handle such that the core of the cable rotates which in turn rotates the override gear. The rotating override gear drives the lead screw gear to apply or release the parking brakes without use of the electric motor. Preferably, the handle is automatically disengaged from the override gear 80, or the override gear 80 is disengaged from the lead screw gear 38, when the manual override 78 is not in use. See U.S. patent application Ser. No. 09/729,254, filed on Dec. 1, 2000 and titled "Electric Parking Brake Manual Override", the disclosure of which is expressly incorporated herein in its entirety by reference, which discloses a suitable override system in more detail.

As best shown in FIGS. 1–6, the control module 14 is provided with suitable logic and memory electronics for operating the cable tensioning device 12 in a desired manner. The control module 14 receives input signals from the operator input device 16 and the cable tensioning device 12. The operator input device 16 preferably sends signals to the control module 14 to apply or release the parking brakes 20. It is noted that the control module 14 can alternately or additionally receive signals from a motor vehicle control system to automatically apply or release the parking brakes 20 as desired. The cable tensioning device 12 preferably sends signals to the control module 14 indicating cable tension, such as the operating current of the electric motor 22, and signals indicating cable travel, such as rotational information from the hall effect sensor indicating the number of rotations of the electric motor 22. The control module 14 preferably sends signals to the operator input device 16 indicating that the parking brakes 20 are applied or that there has been a failure to apply or release the parking brakes. The control module 14 preferably sends signals to the cable tensioning device 12 to start and stop the electric motor 22.

When applying the brakes 20, the control module 14 is preferably adapted to stop the electric motor 22 when a predetermined cable tension is obtained. Cable tension can be directly measured or can be indicated when a predetermined motor current is reached. When releasing the brakes 20, the control module 14 is preferably adapted to stop the electric motor 22 after a predetermined cable travel or distance. Cable travel can be directly measured or can be indicated when a predetermined number of rotations have been made by the electric motor 22 or another rotating component. By applying and releasing the brakes 20 in this manner, the EPB system 10 is automatically self-adjusted to compensate for cable stretch, brake pad wear, and other variables. For a more detailed description of this self adjusting feature, see U.S. patent application Ser. No. 09/217,807, the disclosure of which is expressly incorporated herein in its entirety. When applying the parking brakes 20, the control module 14 preferably monitors both the tension, such as by inferring from motor current, and the travel, such as from rotations signals from the hall effect device. The tension information is utilized to stop the electric motor 22 at a predetermined amount of cable tension. The travel information is utilized as a secondary check to stop the electric motor 22 if the device 12 and/or cable 74 has traveled a predetermined distance which indicates that there is something wrong with the system 10. The predetermined distance can be, for example, a certain percentage (e.g. 25%) more than the distance traveled the previous time the parking brakes 20 were applied. When the parking brakes 20 are released, the control module 14 simply stops the electric motor 22 when the predetermined distance is traveled. In either apply or release, the control module 14 preferably stops the electric motor if the predetermined tension and/or distance is not reached in a predetermined amount of time.

The operator input device 16 is preferably located within the vehicle interior for allowing the vehicle operator to selectively send signals to the control module 14. While any suitable control device 16 can be employed, the input device 16 preferably includes an input switch so that the operator can manually select to apply or release the parking brakes 20 and an illuminated indicator or brake light on the vehicle's instrument panel that indicates the status of the parking brakes 20. The switch and the brake light are electrically connected to the control module 14. The instrument panel brake light is illuminated by the control module 14 only upon the completion of a "successful" parking brake application cycle such as, for example, reaching the predetermined shut off motor current. The control module 14 does not illuminate the instrument panel brake light when the vehicle ignition key is in the "off" position. If a parking brake application cycle is not "successful", such as, for example, the predetermined cut-off current is not reached within the predetermined distance, the control module 14 pulses illumination of the brake light to indicate an EPB system fault (e.g., "blinking light" pulse at a rate of two pulses per second). If the EPB system 10 is applied with the vehicle ignition key in the "off" position, the control module 14 illuminates the instrument panel brake light immediately upon the operator turning the vehicle ignition key to the "on" position. Regardless of the EPB system status or operator input, the instrument panel brake light is not illuminated with the vehicle ignition key in the "off" position at any time.

Figure 9:
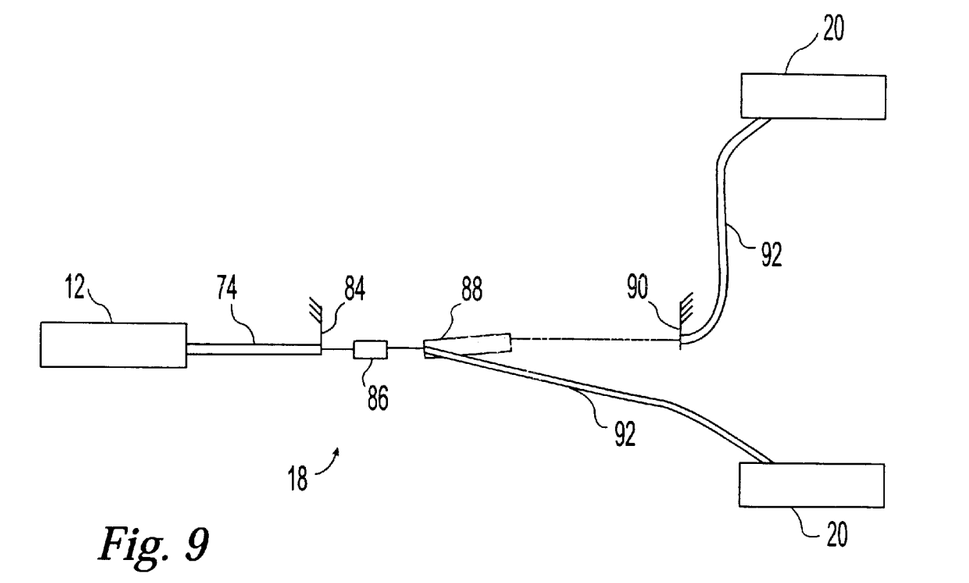
FIG. 9 is a schematic view of the electric parking brake system of FIG. 1 wherein the cable assembly is a conduit reaction system.
Figure 10:
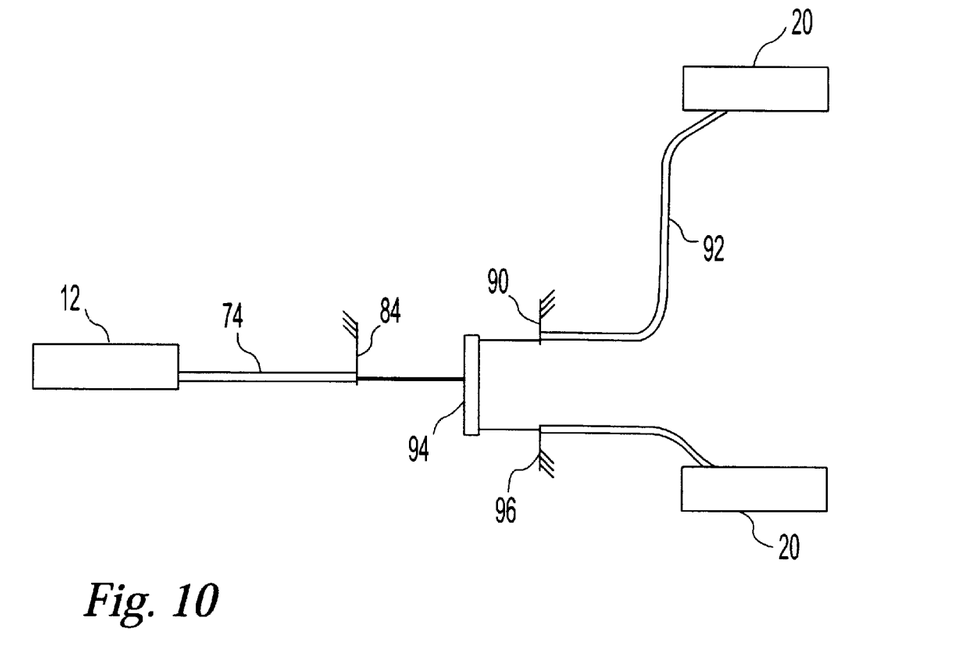
FIG. 10 is a schematic view of the electric parking brake system of FIG. 1 similar to FIG. 9 but wherein the cable assembly is a non-conduit reaction system.

As best shown in FIG. 9, the cable system 18 can be a conduit-reaction-type cable system which transmits load to the brake arms 20 via a conduit reaction bracket in a well known manner. The cable system includes the first or front cable 74 extending from the cable tensioning device 12, a first conduit anchor point 84, a coupler 86, a reaction bracket 88, a second conduit anchor point 90, and two second or rear cables 92 extending to the rear brakes 20. As best shown in FIG. 10, the cable system 18 can alternatively be a non-conduit-reaction-type system. The cable system 18 is similar to that of FIG. 9 but does not include the coupler 86 or the reaction bracket 88 and instead utilizes an equalizer arm 94 and a third conduit anchor point 96. The cables 74, 92 are preferably motion transferring, flexible cables as known in the art.

Figure 11:
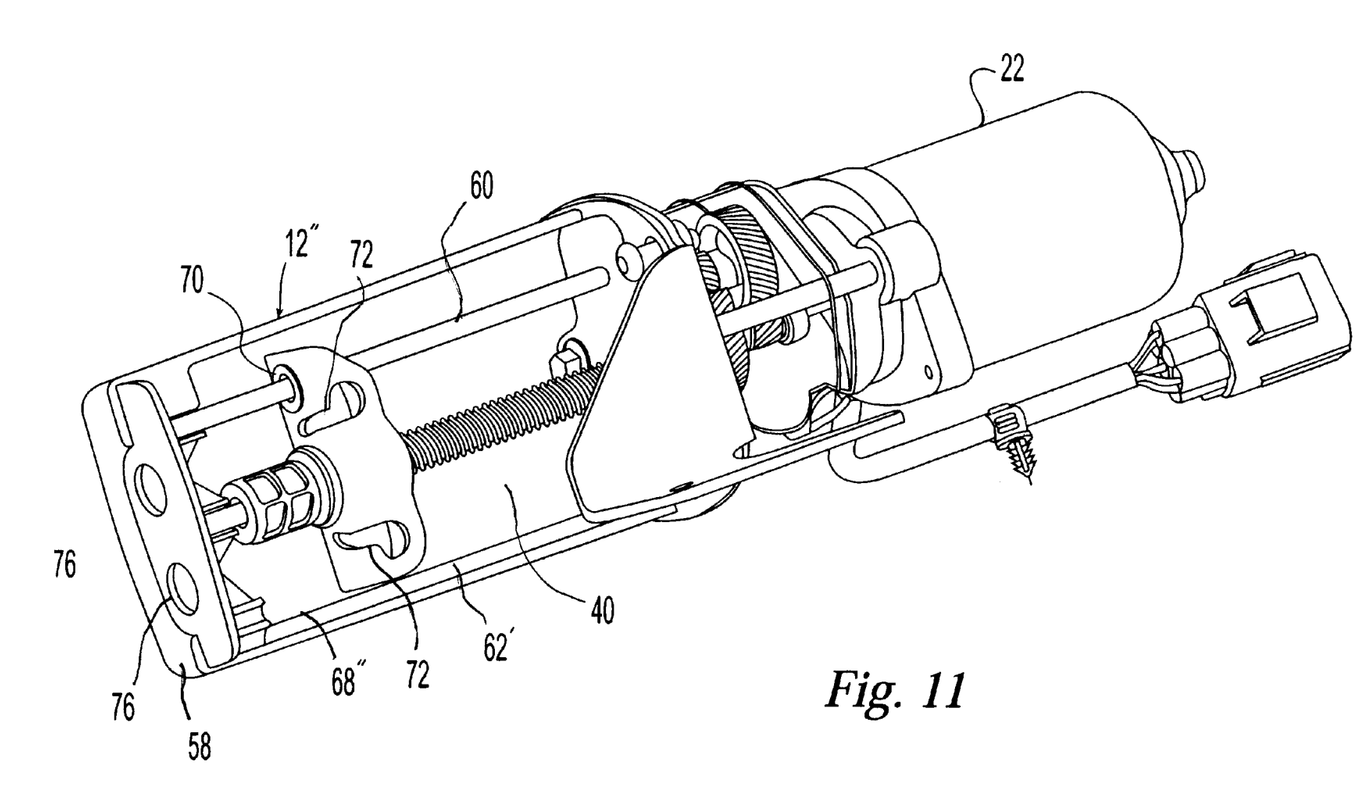
FIG. 11 is perspective view of another variation of the cable tensioning device of FIGS. 2 to 6, wherein two cables can be tensioned and untensioned.

FIG. 11 illustrates a cable tensioning device 12" which is another variation of the cable tensioning device 12 of FIGS. 2–6. The device 12" of FIG. 11 is substantially the same as the device 12 of FIGS. 2–6 except that it has been adapted to tension and untension two cables along parallel lines of action. The same reference numbers have been used to indicate the same structure. The drive nut 62' is provided with a plurality of the attachments 72 for connecting a plurality flexible cables of the cable system 18. The illustrated attachments 72 each include a notch for receiving a connector of the core or strand of the flexible cable. The illustrated drive nut 62' has a pair of attachments 72 located on opposite sides of the lead screw bore 68 so that each of the cables are as close to the axis of the lead screw 40 as possible to limit the amount of off axis loading and as a result efficiency losses. It is noted, however, that the attachments 72 can be located on the same side within the scope of the present invention. It is also noted that the attachments 72 can be located on different sides if the bore 68 which are not opposite one another within the scope of the present invention. The cover 58 is provided with a pair of the openings 76 for connection of the cables to the drive nut 62'.

It should be appreciated that the cable tensioning 12" which tensions and untensions a pair of cables simplifies the cable system 18. The cable tensioning device 12" can be used as a "straight-pull system" with a pair of brakes 20, that is the brakes 20 are each directly connected to the cable tensioning device 12" with a cable. For example, if the system shown in FIG. 10 was adapted to a straight-pull system utilizing the cable tensioning device 12", many components would be eliminated including the flexible cable 74, the first conduit anchor point 84, the second conduit anchor point 90, the equalizer arm 94, and the third conduit anchor point 96 and the rear cables would be directly attached to the cable tensioning device 12". It is noted that each of the features of the various embodiments can be utilized with each of the other embodiments. For example, the embodiment of FIG. 7 incorporating a manual override system (FIG. 7) can tension and untension a plurality of cables such as the embodiment of FIG. 11

In operation, when the operator of the motor vehicle desires to electrically apply the parking brakes 20, the operator sends an apply signal to the control module 14 via the operator input device. In response to the apply signal, the control module 14 starts rotation of the output shaft 30 of the electric motor 22 in the suitable direction. Rotation of the motor output shaft 30 moves the gear train to rotate the lead screw 40. In the illustrated embodiment, rotation of the motor output shaft 30 rotates the first pinion gear 28 via the connecting shaft 32, rotation of the first pinion gear 28 rotates the idler gear 34 through the interlocking teeth therebetween, rotation of the idler gear 34 rotates the second pinion gear 36 through the rigid connection therebetween, rotation of the second pinion gear 36 rotates the lead screw gear 38 through the interlocking teeth therebetween, and rotation of the lead screw gear rotates the lead screw 40 through the rigid connection therebetween. Rotation of the lead screw 40 causes translation of the drive nut 62, toward the gear train and away from the cable assembly 18, which is threadably engaged on the lead screw 40 and held against rotation by the guide shaft 60. The translation of the drive nut 62 pulls and tensions the cable 74 to apply the brakes 20. As the drive nut 62 axially translates along the drive screw 40, the drive nut slides along the guide shaft. As the electric motor 22 is operating, the control module 14 monitors the operating current of the electric motor 22. When the motor operating current reaches a predetermined current which indicates that the cable 74 has a desired tension, the control module 14 stops the electric motor 22 and illuminates the brake light on the vehicle's instrument panel to indicate a successful application of the brakes 20. As the electric motor 22 is operating, the control module 14 also monitors the number of rotations of the electric motor 22 via the hall effect sensor. If the number of motor rotations reaches a predetermined number of rotations which indicates a predetermined travel or distance moved of the cable 74 prior to reaching the predetermined current, the control module 14 stops the electric motor 22 and blinks the brake light on the vehicle's instrument panel to indicate an unsuccessful application of the brakes. The predetermined travel or distance is selected to be a distance which indicates that there has been a failure of the EPB system 10.

When the operator of the motor vehicle desires to electrically release the parking brakes 20, the operator sends a release signal to the control module 14 via the operator input device. In response to the release signal, the control module 14 starts rotation of the output shaft 30 of the electric motor 22 in the suitable direction, which is opposite the apply direction. Rotation of the motor output shaft 30 moves the gear train to rotate the lead screw 40. In the illustrated embodiment, rotation of the motor output shaft 30 rotates the first pinion gear 28 via the connecting shaft 32, rotation of the first pinion gear 28 rotates the idler gear 34 through the interlocking teeth therebetween, rotation of the idler gear 34 rotates the second pinion gear 36 through the rigid connection therebetween, rotation of the second pinion gear 36 rotates the lead screw gear 38 through the interlocking teeth therebetween, and rotation of the lead screw gear rotates the lead screw 40 through the rigid connection therebetween. Rotation of the lead screw 40 causes translation of the drive nut 62, away from the gear train and toward the cable assembly 18, which is threadably engaged on the lead screw 40 and held against rotation by the guide shaft 60. The translation of the drive nut 62 releases and untensions the cable 74 to release the brakes 20. As the drive nut 62 axially translates along the drive screw 40, the drive nut slides along the guide shaft. As the electric motor 22 is operating, the control module 14 monitors the number of rotations of the electric motor 22 via the hall effect sensor. When the number of motor rotations reaches a predetermined number of rotations which indicates a predetermined travel or distance moved of the cable 74, the control module 14 stops the electric motor 22 and illuminates the brake light on the vehicle's instrument panel to indicate a successful release of the brakes. If the predetermined number of rotations is not reached in a predetermined period of time which indicates there has been a system failure, the control module 14 stops the electric motor 22 and blinks the brake light on the vehicle's instrument panel to indicate an unsuccessful release of the brakes 20.

When the operator of the motor vehicle desires to manually apply the parking brakes 20, the operator manually rotates the core of the manual override cable 92 in the apply direction. Rotation of the cable 82, rotates the override gear 80 which is connected for, rotation therewith, such as through a keyed connection. Rotation of the override gear 80 rotates the lead screw gear 38 through the interlocking teeth therebetween. Rotation of the lead screw gear rotates the lead screw 40 through the rigid connection therebetween. Rotation of the lead screw 40 causes translation of the drive nut 62, toward the gear train and away from the cable assembly 18, which is threadably engaged on the lead screw 40 and held against rotation by the guide shaft 60. The translation of the drive nut 62 pulls and, tensions the cable 74 to apply the brakes 20.

When the operator of the motor vehicle desires to manually release the parking brakes 20, the operator manually rotates the core of the dual override cable 82 in the release direction. Rotation of the cable 82, rotates the override gear 80 which is connected for rotation therewith, such as through a keyed connection. Rotation of the override gear 80 rotates the lead screw gear 38 through the interlocking teeth therebetween. Rotation of the lead screw gear rotates the lead screw 40 through the rigid connection therebetween. Rotation of the lead screw 40 causes translation of the drive nut 62, away from the gear train and toward the cable assembly 18, which is threadably engaged on the lead screw 40 and held against rotation by the guide shaft 60. The translation of the drive nut 62 releases and untensions the cable 74 to release the brakes 20.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the power train can each have many different configurations and can be formed of many different manners such as the gear train can be replaced or partially replaced with a pulley/belt assembly. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An electric brake assembly for tensioning a brake cable attached to a brake such that tensioning of the brake cable affects application of the brake and untensioning of the brake cable affects release of the brake, the electric brake assembly comprising, in combination:

an electric motor having an output shaft;

a control module coupled to the electric motor for controlling the electric motor;

a transmission coupling a threaded lead screw to the output shaft of the electric motor;

a drive nut having a lead screw bore threadably receiving the lead screw therein and having a cable attachment for attaching the brake cable to the drive nut, the cable attachment having a central axis offset from a central axis of the lead screw, wherein the control module controls the electric motor such that rotation of the output shaft causes motion of the transmission and rotation of the lead screw, rotation of the lead screw causes linear motion of the drive nut, and linear motion of the drive nut causes tensioning and untensioning of the brake cable; and an elongate guide shaft substantially parallel to and spaced apart from the lead screw, and wherein the drive nut has a guide shaft bore slidingly receiving the elongate guide shaft therein.

2. The electric brake assembly according to claim 1, wherein the cable attachment is located between the lead screw bore and the guide shaft bore such that the brake cable is entirely located between a central axis of the lead screw bore and a central axis of the guide shaft bore.

3. The electric brake assembly according to claim 2, wherein the cable attachment is located substantially midway between the lead screw bore and the guide shaft bore.

4. An electric brake assembly for tensioning a brake cable attached to a brake such that tensioning of the brake cable affects application of the brake and untensioning of the brake cable affects release of the brake, the electric brake assembly comprising, in combination:

an electric motor having an output shaft;

a control module coupled to the electric motor for controlling the electric motor;

a transmission coupling a threaded lead screw to the output shaft of the electric motor;

a drive nut having a lead screw bore threadably receiving the lead screw therein and having a cable attachment for attaching the brake cable to the drive nut, the cable attachment having a central axis offset from a central axis of the lead screw, wherein the control module controls the electric motor such that rotation of the output shaft causes motion of the transmission and rotation of the lead screw, rotation of the lead screw causes linear motion of the drive nut, and linear motion of the drive nut causes tensioning and untensioning of the brake cable; and wherein the transmission comprises a gear train having a plurality of helical gears and the lead screw and the output shaft are substantially coaxial.

5. The electric brake assembly according to claim 4, wherein the gear train is a two-stage gear train.

6. The electric brake assembly according to claim 4, wherein the gear train comprises a first pinion gear substantially coaxial with the output shaft and connected to the output shaft for rotation therewith, an idler gear engaging the first pinion gear for rotation therewith, a second pinion gear substantially coaxial with the idler gear and connected to the idler gear for rotation therewith, and a lead screw gear substantially coaxial with the first pinion gear and engaging the second pinion gear for rotation therewith, and wherein the lead screw is substantially coaxial with the lead screw gear and connected to the lead screw gear for rotation therewith.

7. An electric brake assembly for tensioning a brake cable attached to a brake such that tensioning of the brake cable affects application of the brake and untensioning of the brake cable affects release of the brake, the electric brake assembly comprising, in combination:

an electric motor having an output shaft;

control module coupled to the electric motor for controlling the electric motor;

a transmission coupling a the lead screw to the output shaft of the electric motor;

a drive nut having a lead screw bore threadably receiving the lead screw therein and having a cable attachment for attaching thee brake cable to the drive nut the control module controls the electric motor such that the output shaft causes motion of the transmission and rotation of the lead screw, rotation of the lead screw causes linear motion of the drive nut, and linear motion of the drive nut causes tensioning and untensioning of the brake cable;

a manual override device operatively connected to the lead screw, and wherein the manual override device selectively causes rotation of the lead screw, rotation of the lead screw causes linear motion of the drive nut, and linear motion of the drive nut causes tensioning and untensioning of the brake cable;

wherein the manual override device includes a motion transmitting flexible core operably connected to the lead screw to selectively apply manual rotation to the lead screw.

8. The electric brake assembly according to claim 7, wherein the transmission includes a gear train, and wherein the manual override device includes an override gear operatively engaging the gear train to move the gear train upon rotation of the override gear and a motion transmitting cable operatively connected to the override gear to selectively rotate the override gear.

9. An electric brake assembly for tensioning a brake cable attached to a brake such that tensioning of the brake cable affects application of the brake and untensioning of the brake cable affects release of the brake, the electric brake assembly comprising, in combination:

an electric motor having an output shaft;

a control module coupled to the electric motor for controlling the electric motor;

a transmission coupling a threaded lead screw to the output shaft of the electric motor;

an elongate guide shaft substantially parallel to and spaced apart from the lead screw;

a drive nut having a lead screw bore threadably receiving the lead screw therein and a guide shaft bore slidingly receiving the elongate guide shaft therein, the drive nut also having a cable attachment attaching the brake cable to the drive nut, wherein the control module controls the electric motor such that rotation of the output shaft causes motion of the transmission and rotation of the lead screw, rotation of the lead screw causes linear motion of the drive nut along the lead screw and the guide shaft, and linear motion of the drive nut causes tensioning and untensioning of the brake cable;

wherein the cable attachment is located between the lead screw bore and the guide shaft bore;

wherein the cable attachment is located substantially midway between the lead screw bore and the guide shaft bore; and wherein a central axis of the brake cable near the lead screw is parallel to and offset from a central axis of the lead screw.

10. An electric brake assembly for tensioning a brake cable attached to a brake such that tensioning of the brake cable affects application of the brake and untensioning of the brake cable caused release of the brake, the electric brake assembly comprising, in combination:

an electric motor having an output shaft;

a control module coupled to the electric motor for controlling the electric motor;

a transmission coupling a threaded lead screw to the output shaft of the electric motor, the transmission comprising a gear train having a plurality of helical gears, the lead screw and the output shaft being substantially coaxial; and a drive nut having a lead screw bore threadably receiving the lead screw therein and having a cable attachment for attaching the brake cable to the drive nut, wherein the control module controls the electric motor such that rotation of the output shaft causes motion of the transmission and rotation of the lead screw, rotation of the lead screw causes linear motion of the drive nut, and linear motion of the drive nut causes tensioning and untensioning of the brake cable.

11. The electric brake assembly according to claim 10, wherein the gear train is a two-stage gear train.

12. The electric brake assembly according to claim 10, wherein the gear train comprises a first pinion gear substantially coaxial with the output shaft and connected to the output shaft for rotation therewith, an idler gear engaging the first pinion gear for rotation therewith, a second pinion gear substantially coaxial with the idler gear and connected to the idler gear for rotation therewith, and a lead screw gear substantially coaxial with the first pinion gear and engaging the second pinion gear for rotation therewith, and wherein the lead screw is substantially coaxial with the lead screw gear and connected to the lead screw gear for rotation therewith.

13. An electric brake assembly for tensioning a brake cable attached to a brake such that tensioning of the brake cable affects application of the brake and untensioning of the brake cable affects release of the brake, the electric brake assembly comprising, in combination:

an electric motor having an output shaft;

a control module coupled to the electric motor for controlling the electric motor;

a transmission coupling a threaded lead screw to the output shaft of the electric motor;

a manual override device operatively connected to the lead screw;

a drive nut having a lead screw bore threadably receiving the lead screw therein and having a cable attachment for attaching the brake cable to the drive nut, wherein the control module selectively controls the electric motor such that rotation of the output shaft causes motion of the transmission and rotation of the lead screw, rotation of the lead screw causes linear motion of the drive nut, and linear motion of the drive nut causes tensioning and untensioning of the brake cable, and wherein the manual override device selectively causes rotation of the lead screw, rotation of the lead screw causes linear motion of the drive nut, and linear motion of the drive nut causes tensioning and untensioning of the brake cable; and wherein the transmission includes a gear train, and wherein the manual override device includes an override gear operatively engaging the gear train to move the gear train upon rotation of the override gear and a motion transmitting cable operatively connected to the override gear to selectively rotate the override gear.

14. An electric brake assembly for tensioning a brake cable attached to a brake such that tensioning of the brake cable affects application of the brake and untensioning of the brake cable affects release of the brake, the electric brake assembly comprising, in combination:

an electric motor having an output shaft;

a control module coupled to the electric motor for controlling the electric motor;

a transmission coupling a threaded lead screw to the output shaft of the electric motor;

a drive nut having a lead screw bore threadably receiving the lead screw therein and having a cable attachment for attaching the brake cable to the drive nut, wherein the control module controls the electric motor such that rotation of the output shaft causes motion of the transmission and rotation of the lead screw, rotation of the lead screw causes linear motion of the drive nut, and linear motion of the drive nut causes tensioning and untensioning of the brake cable; and wherein the control module is adapted to stop the electric motor, when applying the brake, both upon reaching a predetermined cable tension and upon reaching a predetermined cable travel where the predetermined cable travel indicates a failure; and wherein the control module is adapted to stop the electric motor, when applying the brakes, when the predetermined cable tension is not reached within a predetermined period of time.

15. The electric brake assembly according to claim 14, wherein the electric motor has an operating current varying with load applied to the electric motor, further comprising a current sensor adapted to monitor the operating current, and wherein the control module is adapted to stop the electric motor upon reaching a predetermined cable tension by stopping the electric motor upon reaching a predetermined operating current indicating a desired cable tension.

16. The electric brake assembly according to claim 14, further comprising a hall effect sensor adapted to monitoring rotations of the electric motor, and wherein the control module is adapted to stop the electric motor upon reaching a predetermined cable travel by stopping the electric motor upon reaching a predetermined number of motor rotations indicating a desired cable travel.

17. The electric brake assembly according to claim 14, wherein the control module is adapted to stop the electric motor upon reaching a predetermined cable travel by stopping the electric motor upon reaching a predetermined percentage more than a distance traveled on a previous brake application.

18. The electric brake assembly according to claim 14, wherein the control module is adapted to stop the electric motor both upon reaching a predetermined cable tension and upon reaching a predetermined cable travel without reaching the predetermined cable tension during application of the brake and is adapted to stop the motor upon reaching a predetermined cable travel regardless of the cable tension during release of the brake.

19. The electric brake assembly according to claim 14, wherein the control module is adapted to store a previous cable travel which occurred when applying the brake and the predetermined cable travel is greater than the previous cable travel.

20. The electric brake assembly according to claim 15, wherein the control module is adapted to determine the predetermined cable travel as a predetermined percentage of the previous cable travel.

21. The electric brake assembly according to claim 9, wherein the brake cable directly extends into the cable attachment.

22. The electric brake assembly according to claim 21, wherein the cable attachment is a notch located entirely between the lead screw bore and the guide shaft bore.

23. An electric brake assembly for tensioning a brake cable attached to a brake such that tensioning of the brake cable affects application of the brake and untensioning of the brake cable affects release of the brake, the electric brake assembly comprising, in combination:

an electric motor having an output shaft;

a control module coupled to the electric motor for controlling the electric motor;

a transmission coupling a threaded lead screw to the output shaft of the electric motor;

a drive nut having a lead screw bore threadably receiving the lead screw therein and having a cable attachment for attaching the brake cable to the drive nut, wherein the control module controls the electric motor such that rotation of the output shaft causes motion of the transmission and rotation of the lead screw, rotation of the lead screw causes linear motion of the drive nut, and linear motion of the drive nut causes tensioning and untensioning of the brake cable; and wherein the control module is adapted to stop the electric motor, when applying the brake, both upon reaching a predetermined cable tension and upon reaching a predetermined cable travel where the predetermined cable travel indicates a failure; and wherein the control module is adapted to stop the electric motor, when applying the brakes, when the predetermined cable travel is not reached within a predetermined period of time.

* * * * *